(12) United States Patent
Katayama et al.

(10) Patent No.: US 12,329,182 B2
(45) Date of Patent: Jun. 17, 2025

(54) FEED FOR FISH FARMING

(71) Applicant: NIPPON SUISAN KAISHA, LTD., Tokyo (JP)

(72) Inventors: Naoto Katayama, Tokyo (JP); Hiromi Ito, Tokyo (JP); Takahiro Nagashima, Tokyo (JP); Tsuyoshi Goto, Saga (JP)

(73) Assignee: NIPPON SUISAN KAISHA, LTD, Tokyo (JP)

( * ) Notice: Subject to any disclaimer, the term of this patent is extended or adjusted under 35 U.S.C. 154(b) by 797 days.

(21) Appl. No.: 16/980,076

(22) PCT Filed: Mar. 13, 2019

(86) PCT No.: PCT/JP2019/010280
§ 371 (c)(1),
(2) Date: Sep. 11, 2020

(87) PCT Pub. No.: WO2019/177024
PCT Pub. Date: Sep. 19, 2019

(65) Prior Publication Data
US 2021/0015122 A1    Jan. 21, 2021

(30) Foreign Application Priority Data
Mar. 13, 2018 (JP) .................. 2018-045894

(51) Int. Cl.
*A23K 40/30* (2016.01)
*A23K 10/22* (2016.01)
(Continued)

(52) U.S. Cl.
CPC .............. *A23K 40/30* (2016.05); *A23K 10/22* (2016.05); *A23K 20/147* (2016.05); *A23K 20/163* (2016.05); *A23K 50/80* (2016.05)

(58) Field of Classification Search
CPC ...... A23K 40/30; A23K 10/22; A23K 20/147; A23K 20/163; A23K 50/80; A23K 40/25;
(Continued)

(56) References Cited

U.S. PATENT DOCUMENTS

| 2012/0076897 A1 | 3/2012 | Goto et al. |
| 2015/0072056 A1 | 3/2015 | Le Paih et al. |
| 2021/0015122 A1 | 1/2021 | Katayama et al. |

FOREIGN PATENT DOCUMENTS

| EP | 1875806 A1 | 1/2008 |
| JP | 08280333 A * | 10/1996 |

(Continued)

OTHER PUBLICATIONS

Mitsuaki JP2004065167A English only (Year: 2004).*
(Continued)

*Primary Examiner* — Changqing Li
*Assistant Examiner* — Carrie Glimm
(74) *Attorney, Agent, or Firm* — Banner & Witcoff, Ltd.

(57) ABSTRACT

The purpose of the present invention is to improve the non-defective rate of a feed for fish farming comprising a feed of dual structure through betterment of the shape of an outer envelope of the feed so as to reduce the possibility of leakage, from both ends of the feed, of a liquid oil contained in an inner capsule. The feed for fish farming of Scombridae family fish includes an outer shell forming an outer surface; and an inner filling wrapped by the outer shell such that a side surface presents a substantially cylindrical shape and both end portions are covered and closed by the outer shell, at least one of the both end portions being formed with a protruding portion having a tapering shape in which the outer shell protrudes toward the end portion.

12 Claims, 4 Drawing Sheets

(51) Int. Cl.
    *A23K 20/147* (2016.01)
    *A23K 20/163* (2016.01)
    *A23K 50/80* (2016.01)

(58) Field of Classification Search
CPC ............ A23K 40/2504; A22C 13/0013; A22C 2013/0046; A22C 2013/002; A22C 2013/0053; A22C 2013/0059; A22C 13/00; A22C 2013/004; A22C 2013/0063; A22C 2013/0023; A22C 2013/0076; A22C 11/02; A22C 13/02; A22C 2013/0079; A22C 2013/0083; A22C 2013/0096; A22C 2013/0089; A22C 11/029; A22C 2013/026; A22C 2013/028; A22C 2013/005; A22C 13/0016; A22C 2013/0073; A22C 13/0003; A22C 2013/003; A22C 11/001; A22C 13/0006; A22C 11/00; A22C 11/008; A22C 2013/0036; A22C 11/0209; A22C 11/0227; A22C 11/0281; A22C 17/10; A22C 11/005; A22C 11/006; A22C 11/0254; A22C 11/10; A22C 15/001; A22C 7/00; A23P 30/25; A23P 30/20; A23P 20/20; A23P 20/18; A23P 20/12; A23P 10/35; A23P 20/105; A23P 20/19; A23P 10/30; A23P 20/10; A23P 20/25; A23P 30/10; A23P 30/36; A61K 9/0024; A61K 47/34; A61K 9/0092; A61K 9/2013; A61K 9/2054; A61K 45/06; A61K 48/00; A61K 9/4816; A61K 2800/10; A61K 2800/412; A61K 38/00; A61K 8/11; A61K 8/927; A61K 9/4833; A61K 31/433; A61K 38/09; A61K 49/0002; A61K 49/0409; A61K 49/18; A61K 49/222; A61K 8/0216; A61K 9/0056; A61K 9/5084; A61K 2300/00; A61K 31/137; A61K 31/167; A61K 31/198; A61K 31/428; A61K 31/4535; A61K 35/12; A61K 9/006; A61K 31/135; A61K 31/519; A61K 31/7088; A61K 47/02; A61K 48/005; A61K 49/005; A61K 8/02; A61K 9/0002; A61K 9/1274; A61K 9/16; A61K 9/501; A61K 9/5115; A61K 9/5123; A61K 2800/805; A61K 31/295; A61K 31/401; A61K 31/405; A61K 31/4196; A61K 31/53; A61K 31/5685; A61K 8/0208; A61K 8/492; A61K 8/4926; A61K 8/731; A61K 9/1617; A61K 9/2018; A61K 9/2081; A61K 9/209; A61K 9/7007; A61K 2800/30; A61K 2800/87; A61K 2800/88; A61K 31/132; A61K 31/136; A61K 31/164; A61K 31/40; A61K 31/4025; A61K 31/485; A61K 33/06; A61K 33/44; A61K 36/185; A61K 36/47; A61K 38/23; A61K 38/27; A61K 38/28; A61K 47/12; A61K 47/22; A61K 47/30; A61K 47/32; A61K 47/46; A61K 47/6957; A61K 49/0063; A61K 49/0067; A61K 49/0089; A61K 8/18; A61K 8/347; A61K 8/355; A61K 8/415; A61K 8/60; A61K 9/031; A61K 9/0034; A61K 9/0051; A61K 9/14; A61K 9/143; A61K 9/145; A61K 9/19; A61K 9/20; A61K 9/2009; A61K 9/2072; A61K 9/2077; A61K 9/2086; A61K 9/50; A61K 9/5015; A61K 9/5073; A61K 9/5161; A61K 9/5169; A61K 2800/413; A61K 2800/5422; A61K 31/08; A61K 31/155; A61K 31/165; A61K 31/215; A61K 31/216; A61K 31/337; A61K 31/4355; A61K 31/436; A61K 31/4745; A61K 31/48; A61K 31/496; A61K 31/513; A61K 31/522; A61K 31/675; A61K 31/74; A61K 35/00; A61K 36/00; A61K 38/26; A61K 38/31; A61K 41/0052; A61K 47/10; A61K 47/38; A61K 49/048; A61K 51/1282; A61K 8/0204; A61K 8/0291; A61K 8/0295; A61K 8/411; A61K 8/418; A61K 8/44; A61K 8/4953; A61K 8/732; A61K 8/86; A61K 9/0007; A61K 9/0021; A61K 9/0053; A61K 9/0058; A61K 9/0073; A61K 9/08; A61K 9/4808; A61K 9/4866; A61K 9/5042; A23G 3/54; A23G 4/20; A23G 3/0068; A23G 3/2015; A23G 1/54; A23G 3/42; A23G 4/10; A23G 4/043; A23G 4/046; A23G 3/0021; A23G 1/202; A23G 1/50; A23G 3/50; A23G 4/068; A23G 9/285; A23G 3/343; A23G 7/0012; A23G 3/0065; A23G 3/0072; A23G 3/34; A23G 3/36; A23G 4/025; A23G 4/062; A23G 3/346; A23G 3/52; A23G 3/545; A23G 1/305; A23G 1/36; A23G 1/52; A23G 2200/08; A23G 2220/02; A23G 3/362; A23G 3/38; A23G 3/40; A23G 3/48; A23G 3/563; A23G 4/064; A23G 4/205; A23G 9/322; A23G 9/46; A23G 9/503; A23B 4/16; A23B 4/10; A23B 4/031; A23B 4/048; A23B 4/0526; A23B 4/20; A23B 4/24; A23B 7/015; A23B 7/158; A23B 7/16; A23B 4/03; A23B 4/044; A23B 4/064; A23L 13/00; A23L 13/65; A23L 13/60; A23L 13/67; A23L 13/03; A23L 7/122; A23L 21/10; A23L 21/15; A23L 25/10; A23L 3/3409; A23L 33/16; A23L 13/40; A23L 13/52; A23L 13/62; A23L 29/269; A23L 17/70; A23L 27/79; A23L 29/231; A23L 29/256; A23L 33/115; A23L 33/125; A23L 5/57; A23L 13/424; A23L 13/426; A23L 15/20; A23L 15/35; A23L 29/20; A23L 29/262; A23L 29/281; A23L 29/284; A23L 3/28; A23L 33/12; A23L 11/07; A23L 13/422; A23L 13/50; A23L 21/12; A23L 27/105; A23L 27/72; A23L 29/238; A23L 3/10; A23L 3/3418; A23L 5/11; A23L 5/13; A23L 7/111; A23L 7/17; A61P 35/00; A61P 15/00; A61P 43/00; A61P 31/04; A61P 25/00; A61P 19/00; A61P 25/18; A61P 5/30; A61P 5/32; A61P 25/16; A61P 37/06; A61P 9/10; A61P 13/02; A61P 29/00; A61P 31/12; A61P 21/02; A61P 9/00; A61P 25/14; A61P 25/20; A61P 3/10; A61P 7/02; A61P 11/00; A61P 15/02; A61P 17/00; A61P 27/16; A61P 3/02; A61P 1/00; A61P 13/00; A61P 13/08; A61P 17/12; A61P 19/06; A61P 19/10; A61P 21/04; A61P 25/04; A61P 25/06; A61P 25/08; A61P 25/22; A61P 25/24; A61P 25/28; A61P 25/36; A61P 3/00; A61P 3/04; A61P 3/06; A61P 31/10;
A61P 33/02; A61P 33/06; A61P 33/10;
A61P 39/06; A61P 5/14; A61P 5/24;
A61P 7/10; A61P 9/06; A61P 9/08; A61P
9/12; A21D 13/37; A21D 13/80; A21D
2/02; A21D 13/47; A21D 13/17; A21D
13/19; A21D 13/46; A21D 17/002; A21D
10/00; A21D 17/00; A21D 13/34; A21D
13/38; A21D 13/11; A21D 13/32; A23J
3/227; A23J 3/26; A23J 3/22; A23J 3/04;
A23J 3/16; Y02A 40/81

See application file for complete search history.

(56) References Cited

FOREIGN PATENT DOCUMENTS

| JP | H08-280333 A | 10/1996 |
|---|---|---|
| JP | 2004-65167 A | 3/2004 |
| JP | 2005-027613 A | 2/2005 |
| JP | 2006-304669 A | 11/2006 |
| JP | 2007-185135 A | 7/2007 |
| JP | 2012-065565 A | 4/2012 |
| JP | 5030043 B2 | 9/2012 |
| JP | 5615643 B2 | 10/2014 |
| JP | 5926656 B2 | 5/2016 |
| JP | 6106795 B2 | 4/2017 |
| JP | 7381446 B2 | 11/2023 |

OTHER PUBLICATIONS

NOAA Fisheries (Pacific Bluefin Tuna, 2024, https://www.fisheries.noaa.gov/species/pacific-bluefin-tuna) (Year: 2024).*
International Search Report mailed Jun. 4, 2019 for PCT/JP2019/010280.
Written Opinion mailed Jun. 4, 2019 for PCT/JP2019/010280.
Extended European Search Report issued Dec. 6, 2021 in European Patent Application No. 19767479.9.

* cited by examiner

FEED FOR FISH FARMING

CROSS-REFERENCES TO RELATED APPLICATIONS

This application is the National Stage entry under 35 U.S.C. § 371 of International Application No. PCT/JP2019/010280, filed Mar. 13, 2019 and incorporated herein by reference in its entirety, and claims benefit of and priority from Japanese Application No. 2018-045894, filed on Mar. 13, 2018.

TECHNICAL FIELD

The present invention relates to a feed for fish farming for raising Scombridae family fish and more specifically relates to a feed for fish farming suitable for farming tuna species.

BACKGROUND ART

From the perspective of nutrition, stable supply, environmental pollution concerns and sustained aquaculture, there have been attempts in fish aquaculture to change over from baitfish to artificial feed, and various artificial feeds have been developed. Artificial feeds aligned with palatability to a fish species have been proposed to advance the changeover to artificial feeds, particularly for highly ichthyophagous fish species.

For example, JP 5030 043B and JP 5615643B disclose feeds for fish farming having an outer layer and an inner layer. JP 5030 043B and JP 5615643B describe that these feeds for fish farming are used in highly palatable farmed fish such as tuna species and achieve high feed intake and feed efficiency. JP 5926656B discloses a two-layered structure feed including an outer shell and an inner filling containing a protein raw material and a liquid oil and describes that this feed achieves high feed intake and suppresses oil leakage. Further, JP 6106795B discloses a method for breeding farmed tuna species enriched with vitamin E using the two-layered structure feed.

SUMMARY OF INVENTION

Technical Problem

Since the two-layered structure feed as in the prior art is molded using a encrusting machine, it was unavoidable that the liquid oil (mainly fish oil) contained in the inner filling leaked out from the seam joints of the outer shell on both ends of the feed. That is, in a portion of the seam joint of the outer shell, it is unavoidable that the outer shell becomes thin, and the liquid oil easily leaks from that portion.

An object of the present invention is to reduce the possibility of liquid oil leaking from both ends of the feed by improving the shape of the outer shell, thereby improving the non-defective rate of the feed.

Solution to Problem

The gist of the present invention is the feed for fish farming of Scombridae family fish listed in (1) to (6) below.

(1) A feed for fish farming of Scombridae family fish including: an outer shell forming an outer surface and an inner filling wrapped by the outer shell such that a side surface presents a substantially cylindrical shape and both end portions are covered and closed by the outer shell, at least one of the both end portions being formed with a protruding portion having a tapering shape in which the outer shell protrudes toward the end portion.

(2) The feed for fish farming of Scombridae family fish according to (1), in which in the protruding portion, the outer shell increases in thickness toward the end portion.

(3) The feed for fish farming of Scombridae family fish according to (1) or (2), in which the protruding portion is formed on the both end portions.

(4) The feed for fish farming of Scombridae family fish according to any one of (1) to (3), including: a diameter reducing portion gradually decreasing in diameter from the side surface toward the end portion and having a curved surface outwardly convex, the protruding portion being formed at the end portion of the diameter reducing portion, and a curved portion gradually decreasing in diameter toward the end portion and having a curved surface outwardly concave, the curved portion being formed between the diameter reducing portion and the protruding portion.

(5) The feed for fish farming of Scombridae family fish according to any one of (1) to (4), in which the protruding portion has an imprint in which a diameter of the outer shell forming the outer surface is reduced toward the end portion.

(6) The feed for fish farming of Scombridae family fish according to any one of (1) to (5), in which the outer shell contains starch, protein, and fish meal.

(7) The feed for fish farming of Scombridae family fish according to any one of (1) to (6), in which the Scombridae family fish is a tuna species.

Advantageous Effects of Invention

With the above configuration of the present invention, by improving the shape of the outer shell, leakage of liquid oil from both ends of the feed was reduced, and the non-defective rate of the feed was improved. In addition, the feed intake amount of the feed for farmed fish was increased.

DESCRIPTION OF EMBODIMENTS

Embodiments of the present invention will be described with reference to drawings.

Shape

Figure 1:
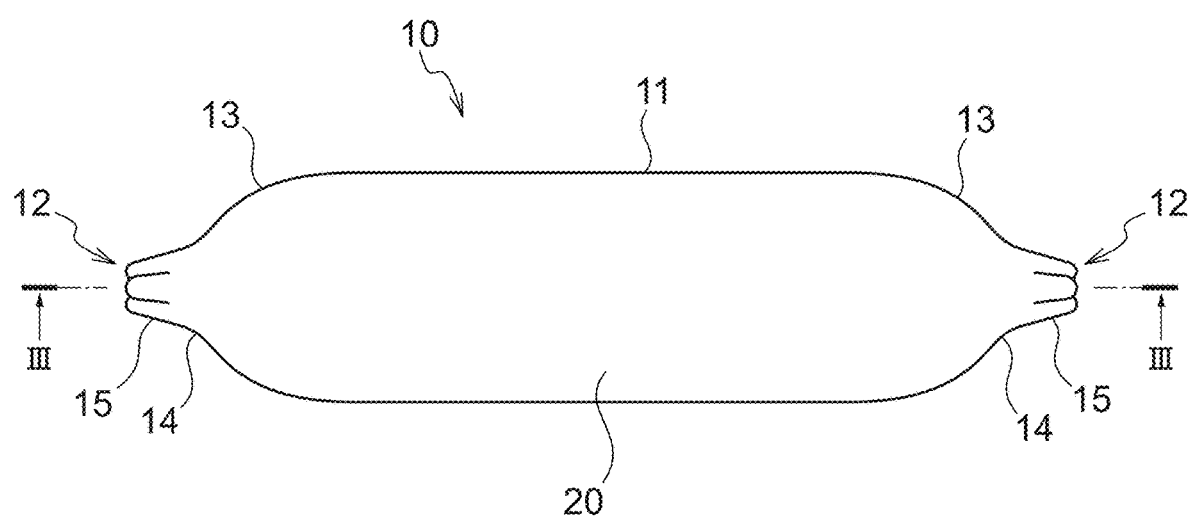
FIG. 1 is a side view of a feed for fish farming of Scombridae family fish according to an embodiment of the present invention.

FIG. 1 is a side view of a feed for fish farming of Scombridae family fish 10 according to an embodiment of the present invention. The feed for fish farming of Scombridae family fish 10 according to the present embodiment includes an outer shell 20 forming an outer surface and an inner filling 30 wrapped in the outer shell 20 (see FIG. 3). As illustrated in the figure, a side surface 11 of the feed for fish farming of Scombridae family fish 10 has a substantially cylindrical shape.

Here, the "substantially cylindrical shape" does not require that the shape of the side surface 11 is a geometrically strictly cylindrical shape, but is sufficient as long as the shape is recognized as a cylindrical or similar shape at first glance. Therefore, the cross section may be slightly distorted or flat, and the cross-sectional shape may be deformed flat due to its own weight or overlap of the feed. The length and thickness of this substantially columnar shape can be appropriately adjusted depending on the species and size of the Scombridae family fish to be fed.

In addition, both end portions 12 are covered and closed by the outer shell 20. At least one of both of the end portions 12 is formed with a protruding portion 15 having a tapering shape in which the outer shell 20 protrudes toward the end portion 12. In this figure, the protruding portion 15 is formed on both of the end portions 12, but in a case where the protruding portion 15 is formed on at least one of both of the end portions 12, the possibility of leakage of liquid oil therefrom is reduced. Of course, as illustrated in FIG. 1, it is preferable that the protruding portions 15 be formed on both of the end portions 12.

Furthermore, as illustrated in FIG. 1, a diameter reducing portion 13 decreasing in diameter from the side surface 11 toward the end portion 12 and having a curved surface outwardly convex is provided, and the protruding portion 15 is formed on the end portion 12 of the diameter reducing portion 13. In this manner, by projecting the outer shell 20 as the protruding portion 15 at the end portion 12, the end portion 12 is formed thicker than the end portion 12 in which the diameter reducing portion 13 is monotonically extended with a curved surface outwardly convex, so that liquid oil is less likely to leak.

In addition, between the diameter reducing portion 13 and the protruding portion 15, a curved portion 14 having a curved surface outwardly concave and gradually decreasing in diameter toward the end portion 12 is formed. It is considered that the presence of the curved portion 14 makes the outer diameter more similar to that of a small fish serving as a bait, thus increasing palatability of the feed for Scombridae family fish.

Figure 2:
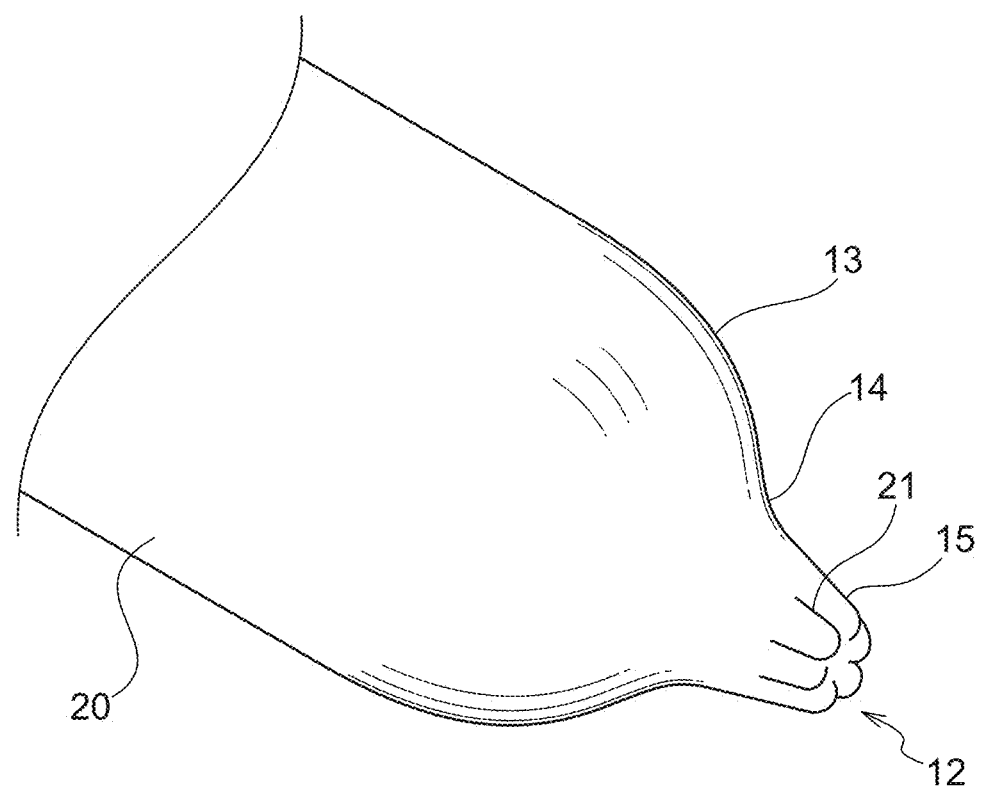
FIG. 2 is a perspective view of an end portion of a feed for fish farming of Scombridae family fish according to an embodiment of the present invention.

As illustrated in the perspective view of FIG. 2, the protruding portion 15 has an imprint 21 showing that the diameter of the outer shell 20 forming the outer surface is reduced toward the end portion 12. The imprint 21 can be composed of, for example, a plurality of radial lines. These lines can be visually or tactilely distinguished, and it is considered that these lines also promote feeding by Scombridae family fish. These lines are preferably formed as grooves that do not reach the inner filling 30. Additionally, the imprint 21 may be formed by squeezing the outer shell 20 in the axial direction.

Figure 3:
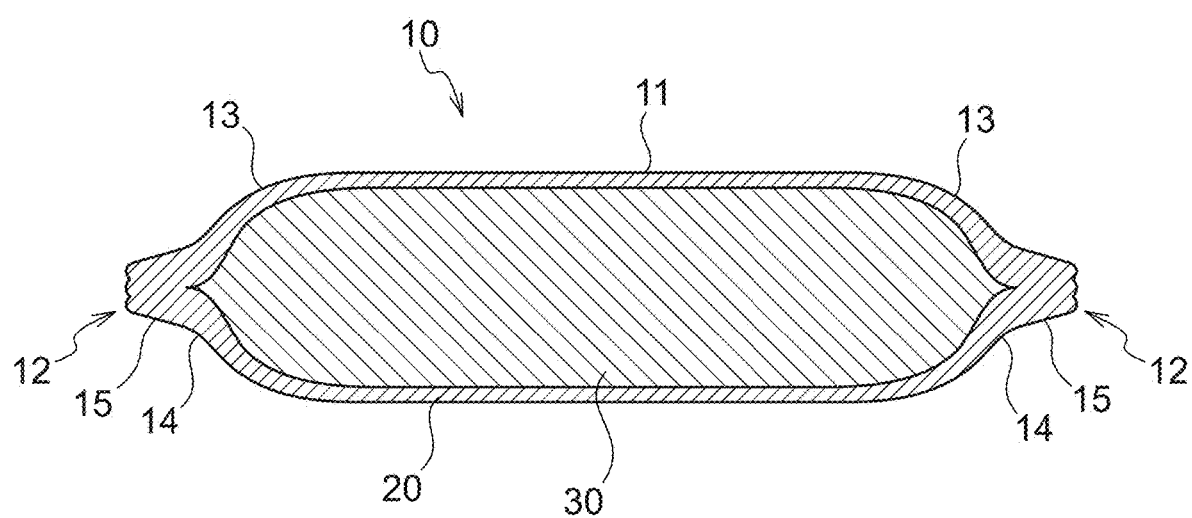
FIG. 3 is a cross-sectional view, taken along the line in FIG. 1, of the feed for fish farming of Scombridae family fish according to an embodiment of the present invention.

Furthermore, as illustrated in the cross-sectional view of FIG. 3 (cross-section of FIG. 1), the outer side of the feed for fish farming of Scombridae family fish 10 is entirely covered with the outer shell 20, and the inner filling 30 is wrapped by the outer shell. It is also recognized that in the protruding portion 15 of the end portion 12, the outer shell 20 is projected with increasing thickness in the direction of the end portion 12. As described above, since the thickness of the outer shell 20 is thicker in the protruding portion 15 than that of the side surface 11, the strength of the outer shell 20 at the end portion 12 is rather increased. This reduces the possibility of leakage of the liquid oil contained in the inner filling 30 from the end portion 12.

The shape of the above-mentioned feed for fish farming of Scombridae family fish 10 is preferably kept until the stage where the feed is finally fed to the Scombridae family fish at the fish farming site. In addition, as long as it has the above-mentioned shape at the time of being formed into a molded product in a process described below, the shape of the protruding portion 15 may be deformed by, for example, being crushed or removed before feeding.

<Outer Shell>

The outer shell 20 may contain one or both of starch and protein as its components. Furthermore, the outer shell 20 may contain fish meal. In the present embodiment, the type of the outer shell 20 is not particularly limited as long as it contains the above components and can wrap the inner filling 30, but the physical properties of the gel formed by heating protein or the gel formed by heating starch are suitable as those of the outer shell 20 in terms of softness and extensibility. As the protein, a protein-containing substance having gel-forming ability such as fish meat, minced fish meat, krill, gluten, collagen, soybean protein, enzymatically degraded soybean protein, gelatin, egg white alone, or a mixture of two or more thereof, is preferable. As the starch, tapioca starch, wheat starch, potato starch, corn starch, bean starch or waxy corn starch, or processed products of these starches are preferred. It is possible to use food is reduces the possibility of leakage of the liquid oil contained in the inner filling 30 from the end portion 12.

The shape of the above-mentioned feed for fish farming of Scombridae family fish 10 is preferably kept until the stage where the feed is finally fed to the Scombridae family fish at the fish farming site. In addition, as long as it has the above-mentioned shape at the time of being formed into a molded product in a process described below, the shape of the protruding portion 15 may be deformed by, for example, being crushed or removed before feeding.

<Outer Shell>

The outer shell 20 may contain one or both of starch and protein as its components. Furthermore, the outer shell 20 may contain fish meal. In the present embodiment, the type of the outer shell 20 is not particularly limited as long as it contains the above components and can wrap the inner filling 30, but the physical properties of the gel formed by heating protein or the gel formed by heating starch are suitable as those of the outer shell 20 in terms of softness and extensibility. As the protein, a protein-containing substance having gel-forming ability such as fish meat, minced fish meat, krill, gluten, collagen, soybean protein, enzymatically degraded soybean protein, gelatin, egg white alone, or a mixture of two or more thereof, is preferable. As the starch, tapioca starch, wheat starch, potato starch, corn starch, bean starch or waxy corn starch, or processed products of these starches are preferred. It is possible to use food ingredients that contain large quantities of these proteins and starches. The outer layer having a composition containing these proteins and starches has a certain strength because the gel is fixed by heating and has softness and also has a holding power for the inner filling 30. It is also possible to use a component which has the physical properties of a gel formed by heating a protein or starch as described above and/or instead, a component which gelates by dissipating heat or cooling a heat-melted matter. Examples of such components include gelatin and agar.

In a case where the main component of the outer shell 20 is a protein, for example, when minced fish meat is used as the main component of the outer shell 20, it can be produced using a method for producing a fish paste product such as kamaboko. Specifically, 2% or greater of common salt is added, and this is left to stand for not less than 10 minutes at a temperature of not lower than 10° C., preferably from 30° C. to 40° C., and then heated for not less than 10 minutes at a temperature of 80° C. to 90° C. Alternatively, when egg white is used, for example, egg white, starch, fish meal, and water are blended in the proportions of 10 wt. %, 10 wt. %, 20 wt. %, and 60 wt. %, respectively, and then heated, thereby producing a composition having the desired physical properties.

In order to increase the nutritional efficiency of the feed for fish farming of Scombridae family fish 10, the feed as a whole preferably has a low water content, high protein, and high fat. It is preferable to add fish meal and oil and fat to the outer shell 20 as long as the gelation of the outer shell 20 is not affected. Depending on the type of gel used, it is possible to add up to 60 wt. % of fish meal and up to 30 wt. % of oil and fat to the outer shell. It is preferable to add approximately from 20 to 30 wt. % of fish meal and from 5 to 10 wt. % of oil and fat.

In order to further improve the quality of the gel in the outer shell 20, it is possible to add additives that are used as quality improving agents in fish paste products and the like. Specifically, in addition to the above-mentioned starch, thickening polysaccharide, soybean protein isolate, sodium bicarbonate, polymeric phosphate, transglutaminase, various protease inhibitors, etc. may be added. In particular, in order to enhance the strength of the gel, a thickening agent such as agar, gellan gum, pullulan, mannan, carrageenan, xanthan gum, locust bean gum, curdlan, pectin, alginic acid or a salt thereof, gum arabic, chitosan, dextrin, or an edible water-soluble cellulose may be added as appropriate. However, because many Scombridae family fishes including tuna species cannot digest polysaccharides well, the quantity of polysaccharides should be kept to the minimum quantity required, and the quantity of thickening agent used is preferably 10 wt. % or less, more preferably 5 wt. % or less, and most preferably 1.5 wt. %, of the materials in the outer shell 20.

As the outer shell 20 of the present embodiment, a heated gel containing starch as a main component is also excellent in its elasticity and softness. A gel obtained by adding water to a starch, kneading, and then heating the mixture exhibits elasticity, softness, and extensibility. In particular, a variety of processed starches have individual characteristics, and by using two or more types thereof, it is possible to obtain the outer shell 20 having properties such as elasticity, softness, and extensibility. For example, it is possible to combine different types of processed starches, such as a combination of an etherified starch and a phosphoric acid crosslinked starch. It is possible to obtain an even stronger gel by adding a protein such as gluten or soybean protein to a starch. For example, gluten-containing wheat flour can also be used instead of gluten. Other secondary raw materials able to be added include: cereal flours such as wheat flour; proteins such as soybean protein, gluten, or egg white; sugars and sugar alcohols such as table sugar or starch syrup; thickening agents such as carrageenan, agar, gellan gum, pullulan, mannan, xanthan gum, locust bean gum, curdlan, pectin, alginic acid or a salt thereof, gum arabic, chitosan, dextrin, or an edible water-soluble cellulose; and salts such as phosphates. For example, it is possible to impart strength to the outer shell 20 by adding wheat flour to a starch. In addition, it is possible to suppress surface stickiness following heating by adding a certain quantity of a protein.

The feed for fish farming of Scombridae family fish 10 of the present invention, in which the inner filling 30 composed mainly of the fish meal and fish oil is wrapped by the outer shell 20 composed mainly of heated gel of starch, has elasticity and softness in the outer shell 20, and thus is preferred by fish. In terms of production efficiency also, it has physical properties such as excellent extensibility and is therefore suitable for covering the inner layer by means of a encrusting machine or an extruder.

The starch used as a main component in the outer shell 20 in the present embodiment is not particularly limited, and examples thereof include tapioca starch, wheat starch, potato starch, corn starch, and bean starch. In particular, processed starches obtained by subjecting these starches to etherification, acetylation, acetyl crosslinking, ether crosslinking, phosphoric acid crosslinking, or alphatized hydroxypropylphosphoric acid crosslinking are preferred. The feed for fish farming of Scombridae family fish 10 of the present embodiment is produced by adding other secondary raw materials such as protein and fish meal to these starches, adding water, mixing, and kneading the mixture to make the outer shell 20, and wrapping the inner filling 30 with the outer shell 20 using a encrusting machine or the like and then heating. Alternatively, it can be produced by supplying the raw materials of the outer shell 20 and the raw materials of the inner filling 30 to an extruder having a double nozzle; and by extruding the outer shell 20 so as to wrap the inner filling 30 while mixing and heat-treating the raw materials of the outer shell 20. The amount of water added to the raw material such as starch may be an amount that can secure a viscosity that can be accommodated by the encrusting machine and extruder, but is preferably about from 30 to 50 wt. %. The heating temperature is required to be not lower than the temperature at which the starch or added protein gelates, and the weight loss of the outer shell 20 is required to be about from 60 to 120° C., preferably about from 70 to 100° C. Since fish oil easily oxidizes, it is preferable to avoid high temperatures exceeding 120° C. as much as possible.

Various patterns can be considered for the blending of the composition of the outer shell 20 containing starch. The nutrients and calories required for a feed differ depending on the species of fish to be farmed and the growth stage of the fish. The more fish meal or fish oil is added, the more rigorous the blending of the outer shell 20 needs to be prepared. However, when the amount of fish meal or fish oil is small, there is considerable freedom in the blending of the outer shell 20. The starch is preferably contained in an amount from 20 to 80 wt. % at least in terms of dry product. When fish powder is added to the outer shell 20 in an amount from 25 to 50 wt. % in terms of dry product, it is preferable to add, in terms of dry product, from 20 to 65 wt. % of starch, from 5 to 20 wt. % of wheat flour, and a total from 5 to 15 wt. % of proteins, oils and fats, thickening agents, salts, and the like. It is preferable to add approximately from 1 to 5 wt. % of fish oil, from 1 to 2 wt. % of phosphate, from 1 to 5 wt. % of protein, and from 1 to 5 wt. % of thickening agent.

When used as a secondary raw material of the outer shell 20, wheat flour is preferably strong flour having a high gluten content, but may also be weak flour.

Additives conventionally used as quality improving agents in starch-based foods may be added to further improve the quality of the outer shell.

<Inner Filling>

The composition of the inner filling 30 is mainly composed of fish meal and oil and fat, but other nutritional components known as nutritional components for fish farming, such as vitamins and minerals, may be added. The inner filling 30 is wrapped in the outer shell 20, but it is not preferable that fish meal or liquid oil and fat leaks out, so that polysaccharides or hardened oils may be blended and emulsified for stabilization. In particular, when producing by a machine, it is preferable that the physical properties of the inner layer composition have flowability and are physical properties having mechanical suitability. Further, it is preferable to add a hardened oil that solidifies fish oil, a porous material that adsorbs fish oil, and the like. Examples of the polysaccharide as the oil and fat adsorbent include Oil Q (trade name, available from Nippon Starch Chemical Co., Ltd.) and powdered soybean protein New Fuji Pro SEH (trade name, available from Fuji Oil Co., Ltd.).

Fish oil is a liquid at room temperature, and the viscosity thereof may be lowered particularly when the temperature rises, and the oil may exude from the outer shell 20. In order to avoid this, it is preferable to mix hardened oil with the fish oil. Hardened oil is white solid fat obtained by hydrogenating animal and vegetable oils such as fish oil, soybean oil and rapeseed oil. Raw material oils include unsaturated fatty acids such as oleic acid, linoleic acid, linolenic acid, and other highly unsaturated fatty acids as component fatty acids. However, hydrogenated oils contain reduced unsaturated fatty acids due to hydrogenation of unsaturated fatty acids, and eventually become saturated fatty acids and solid fats. By adding a hardened oil, a liquid oil can be made into a paste form or solidified. In order to prevent the fish oil contained in the inner filling 30 from leaking or exuding from the feed for fish farming of Scombridae family fish 10 through the cracks or gaps in the outer shell 20, it is preferable to add hardened oil having a melting point of 50° C. or higher. In the hardened oil, the main component of the fatty acids constituting the hardened oil (the most abundant fatty acid in the fatty acid composition) is a fatty acid having 18 or more carbon atoms, and the iodine value (mass of iodine absorbed in 100 g of oil and fat (g unit)) is from 0 to 2. The iodine value of hydrogenated oil sold as an extremely hardened oil falls within this range. Preferred examples of the hardened oil include: extremely hardened pork fat (available from Yokozeki Oil & Fat Industries Co., Ltd.), Unishort K (trade name, available from Fuji Oil Co., Ltd.), Highercin extremely hardened rapeseed oil (trade name, available from Yokozeki Oil & Fat Industries Co., Ltd.), beef tallow extremely hardened oil (available from New Japan Chemical Co., Ltd.), soybean extremely hardened oil (available from Yokozeki Oil & Fat Industries Co., Ltd.), rapeseed extremely hardened oil (available from Yokozeki Oil & Fat Industries Co., Ltd.), and TAISET50 (trade name, available from Taiyo Kagaku Co., Ltd.). In particular, Highercin extremely hardened rapeseed oil (trade name, available from Yokozeki Oil & Fat Industries Co., Ltd.) containing a large amount of fatty acids having 20 or more carbon atoms such as behenic acid having 22 carbon atoms is preferable. The amount of hardened oil added is preferably from 0.5 to 15 wt. %, and particularly preferably from 1 to 10 wt. %, based on the amount of liquid oil such as fish oil in the inner layer. Since the digestibility of hardened oil by fish is considered not high, it is preferable to use it in an amount not exceeding 5% by weight based on the weight of the entire feed. Additionally, by adding a hardened oil, the inner filling 30 has a certain viscosity, and therefore the mechanical suitability when the inner filling 30 is wrapped in the outer shell 20 and molded is good.

Further, raw materials used in known artificial feeds for farmed fish may be added to the composition of the inner filling 30. Examples thereof include: proteins such as baitfish, squid meal, hill meal, soybean lees, and corn gluten meal; oils and fats such as krill oil, whale oil, soybean oil, corn oil, rapeseed oil, and hardened oils; starch-based materials such as starches, wheat flour, rice flour, tapioca powder, and corn powder; alginic acid and salts thereof; polysaccharides such as sodium carboxymethyl cellulose (CMC), guar gum, dextrins, chitosan, curdlan, pectin, carrageenan, mannan, gellan gum, gum arabic, and edible water-soluble celluloses; vitamins; and minerals.

The composition of the inner filling 30 blends from 20 to 70 mass % of oil and fat content and, in cases where the feed is fed to large farmed fish such as the tuna species, the oil and fat content is preferably 30 mass % or higher, more preferably 35 mass % or higher, and most preferably 45 mass % or higher. A high oil and fat content achieves excellent effects in terms of growth and growth efficiency of farmed fish, but if the oil and fat content exceeds 70 mass %, the content of other blending components is reduced, meaning that it is difficult to obtain balanced nutrition. Fish oils and other plant-based oils and fats have highly flowability and may be used without further modification, but it is preferable to reduce the fluidity by using: oil-absorbing polysaccharides such as Vitacel WF200, Vitacel WF600, or Vitacel WF600/30 (all available from J. Rettenmaier & Sohne GmbH+Co. KG), Oil Q No. 50 or Oil Q-S (all available from Nippon Starch Chemical Co., Ltd.), or a dextrin such as Pine Flow (available from Matsutani Chemical Industry Co., Ltd.); oil-absorbing proteins such as fermented soybeans and isoflavones; or hardened oils obtained by hydrogenating oils and fats such as soybean oil, rapeseed oil, or palm oil. Alternatively, it is possible to reduce the flowability by emulsifying fish oils. However, in view of the digestibility by fish, the content of these components that reduce flowability is preferably 10 mass % or lower, and more preferably 5 mass % or lower, of the composition of the inner filling 30. Fish oils are most preferred as the oil and fat, but it is also possible to replace part of the fish oils with other plant-based oils.

As the essential components of the inner filling 30, a variety of fish meals or a powder of crustaceans such as krill commonly used as raw materials for feeds for fish farming may be utilized. The fish meal content is from 30 to 70 mass %, preferably 30 mass % or higher, more preferably 35 mass % or higher, and most preferably 45 mass % or higher.

<Scombridae Family Fish>

In view of the above-mentioned shape, the feed for fish farming of Scombridae family fish 10 of the present embodiment is a feed suitable for farmed fish of Scombridae family, especially tuna species such as Pacific bluefin tuna (*Thunnus orientalis, Thunnus thynnus*), southern bluefin tuna (*Thunnus maccoyii*), yellowfin tuna (*Thunnus albacares*), and bigeye tuna (*Thunnus obesus*).

EXAMPLES

<Method for Producing Feed for Fish Farming of Scombridae Family Fish>

The outer shell 20 has the composition shown in Table 1 below.

TABLE 1

| Ingredient | Content (wt. %) |
| --- | --- |
| Fish meal | 35 to 40 |
| Starch (etherified tapioca starch (G800, available from Nippon Starch Chemical Co., Ltd.)) | 17 to 23 |
| Starch (tapioca acetate starch (Z-300, available from Nippon Starch Chemical Co., Ltd.)) | 2 |
| Wheat flour | 7 |
| Fish oil | 2 |
| Table salt | 3 |
| Table sugar | 2.5 |
| Gluten | 1 |
| Water | Remainder |

The above components were mixed with an extruder at a screw rotation speed of 450 rpm, a discharge temperature of 90° C., and an outlet pressure of 5 MPa to obtain an outer shell composition.

The inner filling 30 had the composition shown in Table 2 below.

TABLE 2

| Ingredient | Content (wt. %) |
|---|---|
| Fish meal | 59 |
| Fish oil | 36 |
| Hardened oil | 1.965 |
| Vitamin | 2 |
| Mineral | 1 |
| α-Tocopherol | 0.035 |

The above composition was mixed at 60° C. using an extruder to obtain the inner filling 30. As the vitamins, those containing 3.03 wt. % of vitamin E in terms of α-tocopherol were used.

To produce a feed for fish farming of Scombridae family fish 10 by combining the outer shell composition and the inner filling 30, an extruder of intermeshed co-rotation twin-screw type having a double nozzle at the tip end portion and a discharge capacity of 1 t/h (available from Baler Holding AG) was used.

Both of the outer shell composition and the inner filling 30 were granulated from the double nozzle at the tip of the extruder, and using a shutter device, the feed for fish farming of Scombridae family fish 10 as a molded product in which the inner filling was enveloped with the outer shell 20 was obtained. The weight ratio of inner filling to outer shell was 7:3. The α-tocopherol content in the feed for fish farming of Scombridae family fish 10 was 621 ppm.

Then, immediately after formation of the feed, the artificial feed was placed on a conveyor and subjected to drying treatment for 24 hours by natural drying in an environment at temperature from 30° C. to 40° C. and relative humidity from 20% to 50%.

By this treatment, a good artificial feed with substantially no cracking and the like on the surface including both end portions 12 was obtained.

The moisture content of the outer shell 20 of the feed for fish farming of Scombridae family fish 10 was from 12% to 17%, and the water activity was less than 0.8. The moisture content of the inner filling 30 was estimated at approximately 4.7% immediately after formation. The moisture content was measured using Drying Over DX300 (available from Yamato Scientific Co., Ltd.), and water activity was measured using Aqualab CX-3 (available from Milestone General K.K.).

Regarding the average size of the feed for fish farming of Scombridae family fish 10, the total length between the curved portions 14 at both ends was 95 mm, the length of the protruding portion 15 from the curved portion 14 was 2.6 mm, and the weight was 38 g.

Figure 4:
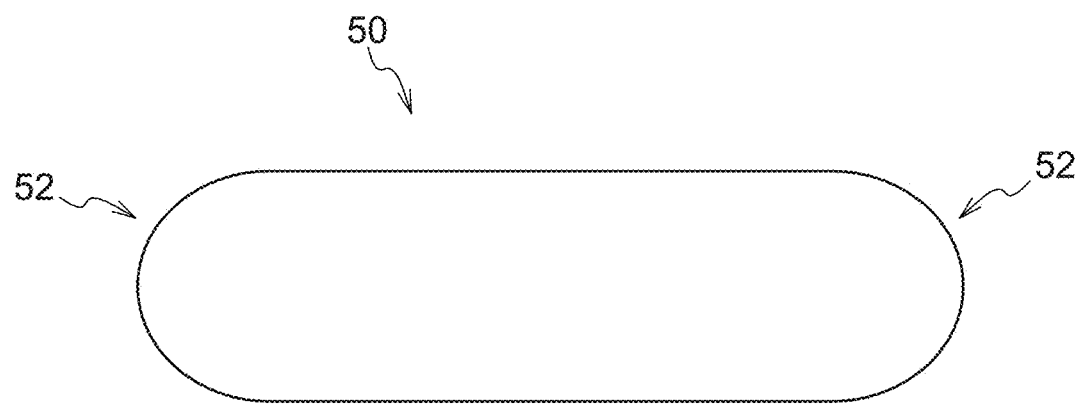
FIG. 4 is a side view of a feed for fish farming in a comparative example.

In addition, as Comparative Example, a feed for fish farming 50 having no protruding portions at both end portions 52 as illustrated in FIG. 4 was produced with the same compositions as the outer shell components and the inner filling 30 and through the same production process.

<Certification of Non-Defective Rate>

After the production and after the drying treatment, the non-defective rate at which no leakage of liquid oil was observed from the end portions 12 and 52 was 65% in Comparative Example, whereas it was 100% in Example.

In addition, as a durability test, the molded product was bent after molding with the shutter device, and the presence or absence of tearing of both end portions 12 and 52 and leakage of the inner filling 30 due to the bending were confirmed. A molded product in which the end portions 12 and 52 were not torn and the inner filling 30 was not leaked even by such bending was defined as a non-defective product, and the ratio of the number of non-defective products with respect to 100 molded products subjected to the durability test was defined as the non-defective rate.

The non-defective rate in the above durability test was 35% in Comparative Example, whereas it was 100% in Example. From the above, it was found that the non-defective rate of the feed for fish farming of Scombridae family fish 10 is significantly improved by providing the protruding portion 15.

<Feeding Test>

The feed for fish farming 50 of Comparative Example was fed to the fish farming cage containing 2000 10 kg size Pacific bluefin tuna until the 42nd day with the feeding start date being the 0th day. From the 43rd day, the feed for fish farming of Scombridae family fish 10 of Example was fed, and the change in the feed intake amount was observed. The feeding method was so-called satiety feeding, in which the tuna was fed as much as it ate. The results are shown in Table 3 below.

TABLE 3

| Days after starting feeding | Example/ Comparative Example | Feeding amount (kg) | Average value (kg) |
|---|---|---|---|
| 0 | Comparative Example | 800 | 710 |
| 3 | Comparative Example | 900 | |
| 6 | Comparative Example | 900 | |
| 7 | Comparative Example | 200 | |
| 8 | Comparative Example | 500 | |
| 10 | Comparative Example | 900 | |
| 12 | Comparative Example | 850 | |
| 14 | Comparative Example | 800 | |
| 17 | Comparative Example | 550 | |
| 19 | Comparative Example | 850 | |
| 22 | Comparative Example | 850 | |
| 24 | Comparative Example | 900 | |
| 26 | Comparative Example | 600 | |
| 30 | Comparative Example | 900 | |
| 33 | Comparative Example | 500 | |
| 36 | Comparative Example | 700 | |
| 38 | Comparative Example | 800 | |
| 40 | Comparative Example | 800 | |
| 41 | Comparative Example | 400 | |
| 42 | Comparative Example | 500 | |
| 43 | Example | 1000 | 990 |
| 45 | Example | 1000 | |
| 46 | Example | 900 | |
| 48 | Example | 1000 | |
| 50 | Example | 1000 | |
| 52 | Example | 1000 | |
| 53 | Example | 1000 | |
| 55 | Example | 1000 | |
| 57 | Example | 1000 | |
| 59 | Example | 1000 | |

As shown in Table 3 above, the average feeding amount was 710 kg (355 g per fish) up to the 42nd day when the feed for fish farming 50 of Comparative Example was fed, while the average feeding amount after the 43rd day when the feed for fish farming of Scombridae family fish 10 of Example was fed was 990 kg (495 g per fish), showing a clear increase. From this, it is considered that the feed intake was increased by the presence of the protruding portion 15 at the end portion 12 of the feed for fish farming of Scombridae family fish 10 of Example. The reason for this is likely that the feed became closer to the spindle shape like small fish such as sardines that tuna prefers.

The invention claimed is:

1. A feed for fish farming of Scombridae family fish comprising:
   an outer shell forming an outer surface; and
   an inner filling wrapped by the outer shell such that a side surface of the outer shell presents a substantially cylindrical shape having two ends that cover and close the inner filling,
   wherein at least one end of the two ends comprises a protruding portion having a tapering shape,
   wherein the inner filling extends into the protruding portion, and
   wherein, in the protruding portion, the outer shell increases in thickness toward the at least one end.

2. The feed for fish farming of Scombridae family fish according to claim 1, wherein the protruding portion further comprises an imprint in which a diameter of the outer shell forming the outer surface is reduced toward the at least one end, and wherein the imprint comprises a plurality of radial lines.

3. The feed for fish farming of Scombridae family fish according to claim 1, wherein the protruding portion is formed on both of the two ends.

4. The feed for fish farming of Scombridae family fish according to claim 1, comprising:
   a diameter reducing portion gradually decreasing in diameter from the side surface toward the at least one end and having a curved surface outwardly convex, the protruding portion being formed at an end portion of the diameter reducing portion; and
   a curved portion gradually decreasing in diameter toward the at least one end and having a curved surface outwardly concave, the curved portion being formed between the diameter reducing portion and the protruding portion.

5. The feed for fish farming of Scombridae family fish according to claim 1, wherein the tapering shape is defined such that a diameter of the protruding portion is reduced toward the at least one end.

6. The feed for fish farming of Scombridae family fish according to claim 1, wherein the outer shell comprises starch, protein, and fish meal.

7. The feed for fish farming of Scombridae family fish according to claim 1, wherein the Scombridae family fish is a tuna species.

8. The feed for fish farming of Scombridae family fish according to claim 2, wherein the protruding portion is formed on both of the two ends.

9. The feed for fish farming of Scombridae family fish according to claim 8, comprising:
   a diameter reducing portion gradually decreasing in diameter from the side surface toward the at least one end and having a curved surface outwardly convex, the protruding portion being formed at an end portion of the diameter reducing portion; and
   a curved portion gradually decreasing in diameter toward the at least on end and having a curved surface outwardly concave, the curved portion being formed between the diameter reducing portion and the protruding portion.

10. The feed for fish farming of Scombridae family fish according to claim 9, wherein the tapering shape is defined such that a diameter of the protruding portion is reduced toward the at least one end.

11. The feed for fish farming of Scombridae family fish according to claim 10, wherein the outer shell comprises starch, protein, and fish meal.

12. The feed for fish farming of Scombridae family fish according to claim 11, wherein the Scombridae family fish is a tuna species.

* * * * *